Dec. 16, 1952  E. L. ECKFELDT  2,621,671
ELECTROLYTIC TITRIMETER
Filed Nov. 21, 1944  2 SHEETS—SHEET 1
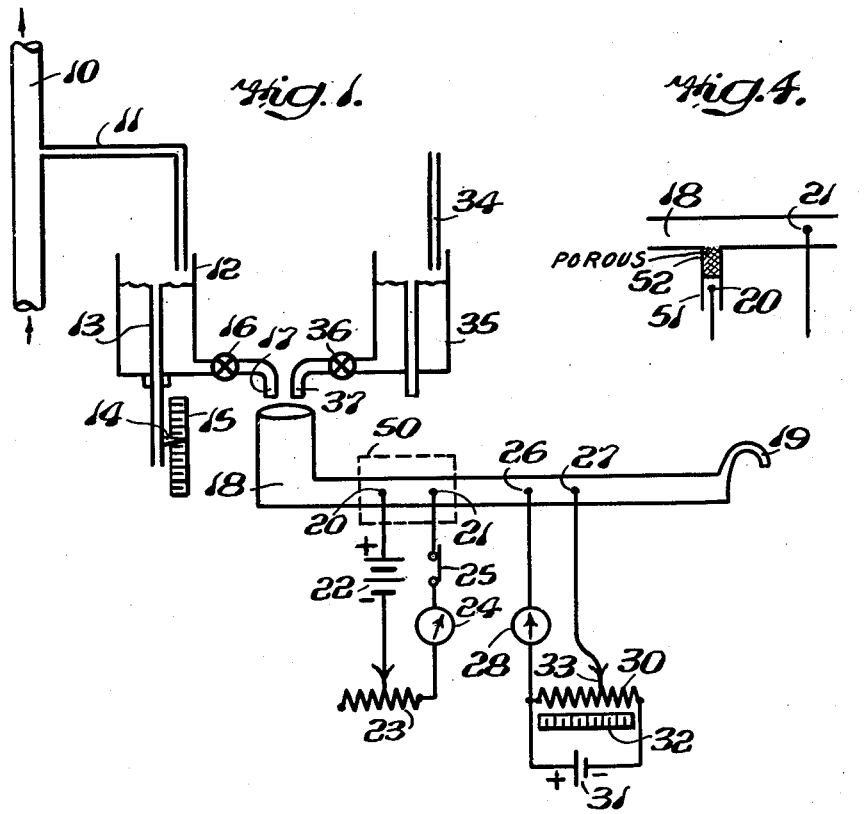
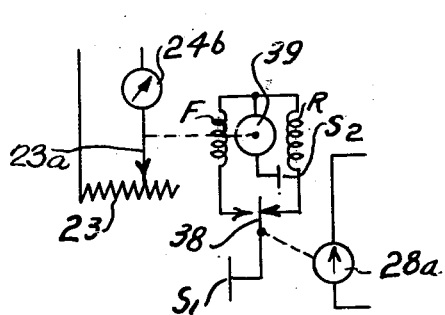
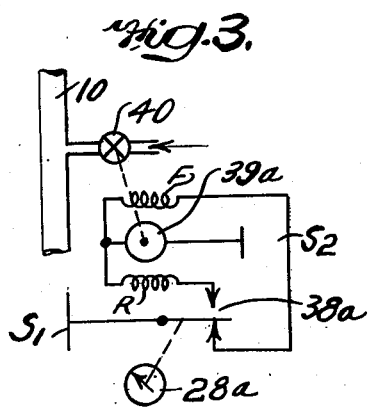
INVENTOR
EDGAR L. ECKFELDT
BY Virgil E. Woodcock
ATTORNEY

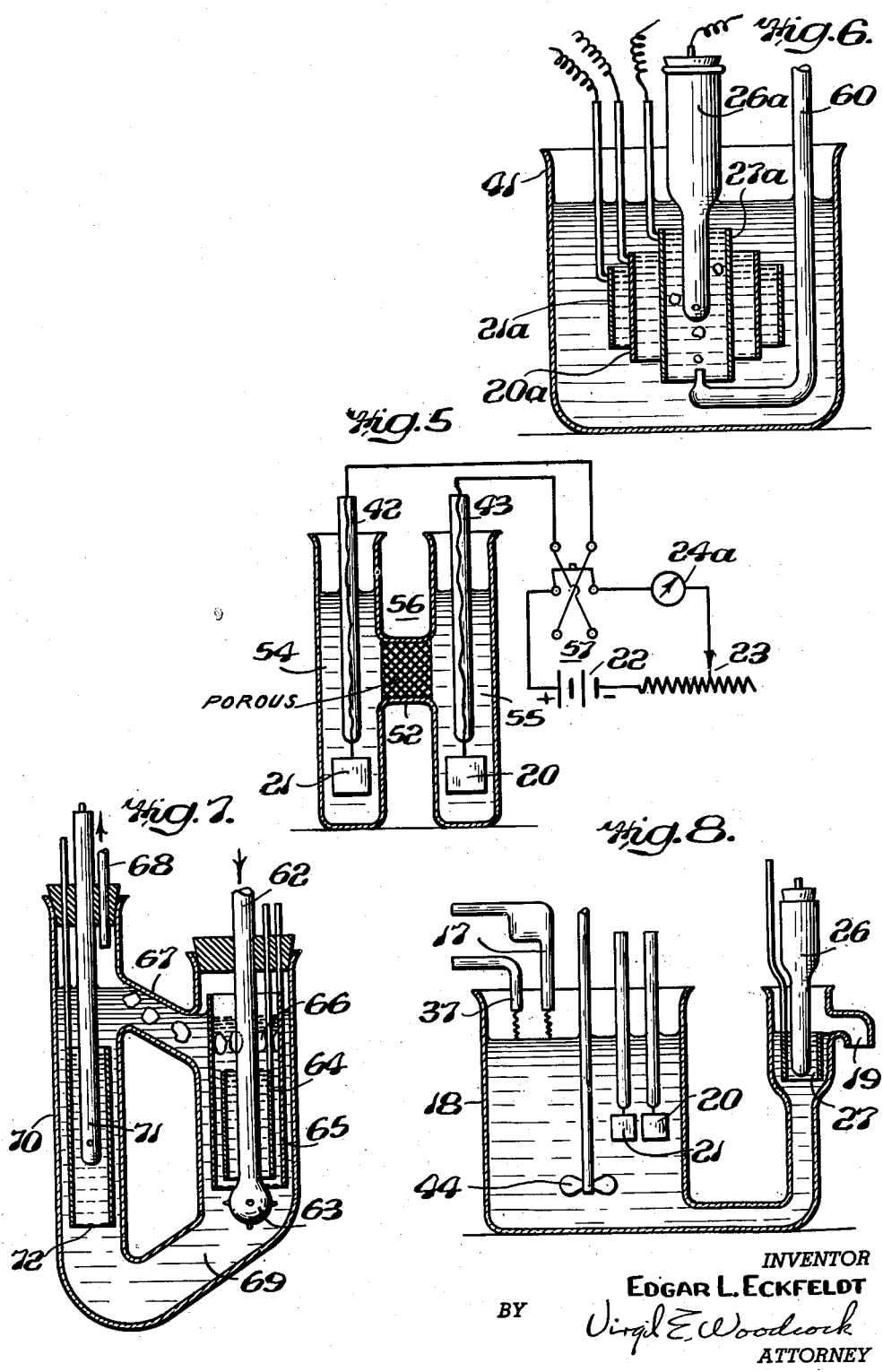

Patented Dec. 16, 1952

2,621,671

UNITED STATES PATENT OFFICE 2,621,671

ELECTROLYTIC TITRIMETER

Edgar L. Eckfeldt, Ambler, Pa., assignor to Leeds and Northrup Company, Philadelphia, Pa., a corporation of Pennsylvania Application November 21, 1944, Serial No. 564,536

13 Claims. (Cl. 137—5)

This invention relates to methods and apparatus for determining or establishing compositional characteristics of substances, and has for an object the provision of a reliable system by means of which a selected compositional characteristic may be readily ascertained.

In many processes it is important accurately to measure compositional characteristics of substances. These measurements may be made on, for the control of, reagents used in the treatment of substances as well as for volumetric determination of the character of the end product of a reaction system. Heretofore, the measurement of a compositional characteristic of a substance, as accomplished by volumetric analysis, involved the addition of a reagent of known concentration in known quantity sufficient to just produce a stoichiometric reaction, which commonly is referred to as bringing the solution to an end-point.

More particularly, in acidimetry and alkalimetry, a reagent, either a base or an acid, as required, of known concentration is added to the known volume of a sample until a desired end-point is attained. Knowing the concentration and the volume of the added base or acid, the acidity or alkalinity of the original sample may be ascertained. Systems of this character require not only highly accurate measurement of the volume of the added reagent, but they also require equally accurate knowledge of the concentration of the reagent.

The preparation of reliable standard solutions involves the expenditure of considerable effort and frequently indirect, tedious, and time-consuming techniques must be employed. Moreover, the efforts so expended may be nullified by the inevitable changes in such solutions which often take place with the passage of time. This is especially true with dilute solutions where the slightest amount of impurity might cause change which would be very material. Apparatus which is employed in volumetric analysis must be handled with skill, and errors may arise in measurements of volumes of standardized solutions when inadequate precautions are observed. Furthermore, the effect of temperature on the volumes of solutions is appreciable and in careful work introduces an additional factor for which allowance must be made. Since both the concentration and the volume of the standard solution are required in calculating or determining an unknown, in volumetric analysis an uncertainty or error in either of these will affect the final result.

It is, therefore, an object of the present invention not only to eliminate some of the many steps required in carrying out conventional titration, but also to eliminate the constant need for standardized reagents as a part of titrimetric systems.

It is a further object of the invention to utilize an electrical method and system for producing a known current which is so utilized as to replace the numerous standard solutions heretofore required in titrimetric systems.

It is a further object of the invention to produce electrically a reagent, which is related in amount to the coulombs of electricity, which is utilized in place of standardized solutions and the burette equipment associated therewith.

In carrying out the invention, an electric current is applied electrolytically to change the compositional characteristic of substances in manner such that the desired measurement may be attained in terms of an electrical quantity which is correlated with the aforesaid change in the compositional characteristic. For example, in determining the total acidity or the total alkalinity of solutions, an electrical current is so applied to the solution as to electrolytically produce a neutralizing or titrating reagent.

In accordance with the present invention advantage is taken of the fact that the rate of production of the neutralizing reagent is proportional to, or may be readily correlated with, the applied electrical current. Accordingly, the invention makes possible continuous operation of systems for determining compositional characteristics in terms of the rate of flow of the unknown material and in terms of the applied electrical current. Since there is correlation between the rate of production of the reagent and the current flowing, the quantity of reagent formed in a given time may be known in terms of coulombs. For batch operation, the amount of reagent formed is directly determined by ascertaining the coulombs of electricity.

Further in accordance with the invention, suitable indicators or indicating systems, well known to those skilled in the art, may be utilized for the determination of the arrival of an unknown substance at a given end-point.

From the foregoing it will be seen that the present invention contemplates controlling by electrolysis in situ in the reaction zone the amount of titrating agent present and available for the titration reaction. The amount of the titrating agent consumed in the reaction may be known from the measurement of the current consumed in the electrolysis in production of the titrating agent. Thus, one aspect of the invention contemplates the electrolytic generation in situ of the titrating agent and the control of the amount generated by controlling the current employed in the electrolysis in response, as for example, potentiometrically, to the unreacted amount of one of the reactants, and the measurement of the current used to generate the titrating agent. Where the concentration of a constituent in a solution is determined potentiometrically, or where there is potentiometric sensing of the unreacted amount of one of the reactants, it is desirable that the circuit externally of the cell or reaction zone in which the electrolytic current is varied in response to variations in the sensed potential be separate or electrically isolated from the potentiometric detecting circuit.

The term "end-point" as used in the specification and claims means that a given compositional characteristic has a known value, whether that value be a particular magnitude of the compositional characteristic or whether it be an absence of the particular substance originally in the material under test. Hence, the end-point serves significantly to indicate when to terminate the electrotitrating action.

For a more complete understanding of the invention and for further objects and advantages thereof, reference is to be had to the accompanying drawings, in which:

Fig. 1 diagrammatically discloses a continuous sampling system, which may also be used for batch operation, embodying the invention;

Fig. 2 illustrates a preferred modification applicable to Fig. 1;

Fig. 3 illustrates a system of control applicable to the system of Fig. 1;

Fig. 4 illustrates a modification applicable to the system of Fig. 1;

Fig. 5 illustrates apparatus for, and a system of, producing electrotitration capable of being reversed;

Fig. 6 illustrates a further modification, in accordance with the invention; and Figs. 7 and 8 illustrate, partly in section, apparatus suitable for carrying out the invention as shown in Fig. 1.

Referring to Fig. 1, the invention in one form has been illustrated as applied to the determination of a compositional characteristic of a fluid flowing through a pipe 10. This fluid may be a liquid used in an industrial process and with respect to which a particular compositional characteristic is of importance. By means well understood in the art, a sample may be continuously withdrawn from the pipe 10 by means of a small pipe 11, which delivers the sample into a constant-head receptacle 12. A constant head is maintained within the receptacle 12 by reason of an overflow pipe 13 which may be adjusted within the receptacle 12, a pointer 14 being arranged to indicate on a scale 15 a particular setting of the inlet opening of the overflow pipe 13. The sample of the liquid, under the control of a valve 16, is discharged by pipe 17 into a flow channel 18, having a suitable exit pipe 19 for discharge of the liquid therefrom.

Disposed within the flow channel 18 are means for producing electrolysis comprising electrodes 20 and 21 supplied with current from a suitable source of supply as indicated by the battery 22. The magnitude of the current is under the control of a variable resistor 23 and by means of an ammeter or other indicating device 24, indication is had of the current flowing in the circuit. A switch 25 is provided for opening and closing the circuit.

Though other forms of indicators may be utilized, as will be explained hereinafter, in Fig. 1 the end-point or other value of the compositional characteristic is ascertained by a system for indicating changes in the potential between a pair of electrodes 26 and 27 connected to a suitable indicating device, such as a galvanometer 28 and to a potentiometer resistor 30 supplied from a battery 31. The resistor 30 preferably has a scale 32 associated therewith so that the contact 33 may be set for the production of a predetermined potential in opposition to that developed between the electrodes 26 and 27. Normally the setting of contact 33 is such that the pointer of the galvanometer 28 is at its neutral or null position when the solution surrounding electrodes 26 and 27 is at the desired end-point.

The present invention is characterized by the utilization of a known electrical quantity which directly determines the change required in said compositional characteristic to bring it to the desired end-point. For example, if the particular fluid flowing through the pipe 10 comprises an aqueous solution of hydrochloric acid, the contact 33 is moved to such a position with respect to the scale 32 that the pointer of the galvanometer 28 will indicate zero when the end-point is attained. This material flowing through the sampling pipe 11 and into the constant-head device 12, flows into the channel 18 and is there subjected to electrolysis. The electrolytic action between the anode 20, preferably of silver, and the cathode 21, preferably of platinum, produces chemical reactions characterized by the union of the chlorine from the hydrochloric acid with silver from the anode to form silver chloride. Silver chloride is practically insoluble, and, hence, is removed from solution. At the same time, hydrogen is given off at the cathode 21. The rapidity with which the silver chloride and hydrogen are formed depends upon the magnitude of the current flowing between the electrodes 20 and 21.

The resistor 23 is, therefore, adjusted to increase the current flow until the pointer of the galvanometer 28 reaches its zero or null position, thus indicating that the end-point of the solution of hydrochloric acid after electrolysis, has been reached; in other words, indicating that all of the chloride ions have combined with the silver, leaving a solution free of hydrochloric acid. The indicating system may be responsive to change in the pH or to the silver ion concentration, depending upon the nature or kind of detecting electrodes used. In either case, a potential change is produced in the region of the end-point or the equivalent point. For utilization of pH values, any suitable detecting electrode may be utilized, such as the glass electrode, the hydrogen electrode, or the antimony electrode in combination with a suitable reference electrode such as the calomel electrode with a potassium chloride bridge.

So long as the concentration of the hydrochloric acid in the solution passing through the pipe 10 remains constant, the relationship established between the flow of the solution through the pipe 17 and the flow of current, as indicated by the meter 24, between the electrodes 20 and 21 remains constant. Therefore, it will be apparent that if the concentration of hydrochloric acid in the solution passing through the pipe 10 should increase, it is possible to decrease the head within the container 12 by lowering the pipe 13. By so decreasing the head, the rate of flow of the fluid into the channel 18 is decreased by an amount which may be determined by reading the scale 15. This decreases the rate of flow of the fluid into the channel 18 and the rate of flow of the solution past the electrodes 20 and 21. In consequence, the material will remain between the electrodes 20 and 21 for a greater length of time and will be subjected to a greater electrolytic action. Consequently, more silver chloride will be formed from the same amount of sample. The provision of the additional time permits the complete removal of the hydrochloric acid from the solution. Of course, the same result may be accomplished by leaving the fluid flow constant at its original value, and increasing the flow of current. The dependent relationship between the two rates of flow being known, the hydrochloric acid concentration of the original stream passing through the pipe 10 may be readily ascertained.

Upon consideration of the foregoing, it will be seen that as the concentration of hydrochloric acid in the fluid passing through the pipe 10 increases, the current required to produce neutralization or removal of the hydrochloric acid from a fixed rate of flow of sample must also be increased. Also, that with a given flow of current, the rate of flow of the fluid within the channel 18 must be decreased as the concentration of hydrochloric acid is increased.

The conductivity of the hydrochloric acid solution should be adequate. If the conductivity is low, it is desirable, in accordance with the invention, to add to the sampling stream a substance which, though neutral in other respects, does increase the conductivity of the solution. Such a substance, for example sodium nitrate, may be conveniently added from a suitable source of supply (not shown) from which there extends an inlet pipe 34 which leads to a constant head container 35 and flows under the control of valve 36, by pipe 37, to the flow channel 18. The effect of the added sodium nitrate is to reduce the resistance of the solution; that is, for a given voltage, a greater flow of current may be produced between the electrodes 20 and 21. With or without the added sodium nitrate, the electrolysis or electrolytic action is dependent upon the magnitude of the current flowing between electrodes 20 and 21. Consequently, a measurement of the magnitude of the current flow provides an accurate determination of the rate at which the silver chloride is formed. When it is formed at a rate which removes the hydrochloric acid from the solution, the value of the original concentration thereof may be readily determined in terms of current flow.

It will now be readily understood that all of the hydrochloric acid may be removed from the solution but an end-point short of complete removal of the acid may be preferred, as for example, when automatic operation of the system is desired. If sufficient hydrochloric acid is removed so as to bring the solution to a predetermined or readily ascertained concentration, the original concentration thereof may be readily determined by suitable calculations.

In some applications of the invention it may be desired to have the end-point short of the complete removal of the substance being measured, as for example the hydrochloric acid, in which case again a suitable calculation will yield the original concentration.

Let the following symbols be defined:
$I$ = current between the electrodes 20 and 21 which is required to cause the reaction with the substance being titrated.
$R$ = rate of flow of solution containing the substance being titrated which passes into channel 18.
$N$ = normality of the solution with respect to the substance being titrated.
$V$ = volume of solution.
$E$ = the number of chemical equivalents.
$Q$ = coulombs.
$t$ = time.

The well-known relationship between the quantity of current which passes, and chemical equivalents is given by the following equation:

$$E = \frac{Q}{96,500} \qquad (1)$$

When V is in liters, normality is given by:

$$N = \frac{E}{V} \qquad (2)$$

and substituting the value of E from (1) into the Equation 2, the following equation is obtained:

$$N = \frac{Q}{96,500V} \qquad (3)$$

If I and t are amperes and seconds respectively, and I is constant over the time t, Equation 3 may be written:

$$N = \frac{It}{96,500V} \qquad (4)$$

When the rate of flow is constant, the variable V may be substituted by its equivalent Rt, and when R is liters per second:

$$N = \frac{I}{96,500R} \qquad (5)$$

This last Equation 5 shows the interrelationship between the normality of the solution, the current, and the rate of flow of the solution. The conversion of normality to other expressions of concentration and the calculation, from the normality, of the weight of a substance in a particular volume are well-known operations to those skilled in the art.

From the foregoing equations it will be understood that for a given rate of flow of fluid through the flow channel 18, the ammeter 24 may be calibrated directly in terms of the compositional characteristic under measurement. Hence, the meter 24 may also take the form of a recording ammeter and the chart thereof may be calibrated directly in terms of the compositional characteristic.

Since the rate of production of the titrating agent is known in terms of current flow, the system of Fig. 2 is preferably utilized in connection with the flow channel arrangement of Fig. 1. Specifically, the detecting device or galvanometer 28a is arranged to control, as by means of a single-pole double-throw switch 38, the energization from supply lines S1 and S2 and the direction of rotation of a reversible motor 39 arranged to adjust the setting of the contact 23a of resistor 23. By a simple control of this character, the current flow is maintained at such a value as to maintain the sample at its predetermined endpoint. Hence, the continuous record made by a recording ammeter 24b shows the variation of the compositional characteristic of the sample with respect to time. With Fig. 2 utilized in the system of Fig. 1 as above explained, there is provided a current regulator having a sensing circuit including the pair of voltage-producing sensing electrodes 26 and 27 neither of which carries any of the direct current flowing between generating electrodes 20 and 21. Also included in the sensing circuit is a means such as potentiometer resistor 30 for developing in that circuit a potential difference representative of the selected end-point of the constituent in the electrolyte in vessel or flow channel 18. The current regulator also includes a power circuit including generating electrodes 20 and 21 in the electrolyte.

The sensing circuit externally of said electrolyte is electrically isolated from said power circuit. The ammeter 24b comprises a current measuring means in the power circuit which circuit also includes suitable means, as resistor or rheostat 23 for establishing the magnitude of current flow between generating electrodes 20 and 21. The magnitude of the direct current will depend upon the setting of contact 32a relative to resistor 23. The motor 39 forming a part of the current regulator adjusts contact 32a as long as there is—or for the duration of—a difference between the potential developed in the sensing circuit by potentiometer resistor 30 and the voltage developed by sensing electrodes 26 and 27. As the concentration of the solution is brought to an end-point, the end-point potential of the potentiometer balances the voltage from the sensing electrodes 26 and 27 and the motor 39 comes to rest. Thus the system brings the concentration of the constituent in the electrolyte to an end-point and maintains it at that end-point.

If it is desired to maintain at a predetermined value the compositional characteristic of the material flowing through the pipe 10, the control system of Fig. 3 may be combined with the system of Fig. 1. In this case the galvanometer 28a again serves, through a single-pole double-throw switch 38a, to control the direction of rotation of a motor 39a to regulate a valve 40 to vary the rate of flow into the pipe 10 of a reagent supplied from a suitable source (not shown) so as to maintain at a predetermined value the compositional characteristic.

In Figs. 2 and 3 the motors 39 and 39a are shown with forward and reverse windings or coils F and R which are selectively energized. They are energized for the time interval during which the galvanometer 28a maintains the energizing circuit closed. In each system, of Figs. 2 and 3, the operation of the motor, 39 or 39a, produces an adjustment or regulatory action which returns the galvanometer 28a to its neutral or zero position.

Other systems with additional refinements may be utilized in conjunction with, or in place of, those illustrated in Figs. 2 and 3. For additional disclosures of suitable systems reference may be had to United States Letters Patent No. 1,530,833, Fig. 7, to Keeler, and No. 1,918,021, Fig. 6, to Doyle.

If the requirements of the particular processes are such that continuous measurements are unnecessary, the system of Fig. 1 lends itself to batch operations. For example, whenever a compositional characteristic is to be determined it is only necessary to remove all material from the flow channel 18 and then by opening the valve 16 to fill it with a fresh sample derived from the main stream flowing through the pipe 10. The overflow or outlet pipe 19 will automatically drain off any excess material and leave in the flow channel a known quantity of the fluid under measurement.

For a batch operation, it will again be assumed that the fluid under measurement is a solution of hydrochloric acid and that the position of the contact 33 corresponds to the desired end-point. In this case, the electrolyzing current is preferably kept constant by suitable adjustment of the resistor 23. By maintaining the electrolyzing current constant and measuring the time of application to the solution in the channel 18 required for the attainment of the end-point, there is readily determined the amount of reagent produced or the extent of the chemical reaction which removes from the solution all of the hydrochloric acid. Instead of maintaining the magnitude of the current constant, the meter 24 may be an ampere-hour meter which registers the time integral of the current. The ampere-hours or the coulombs of electricity required to bring the solution in the flow channel 18 to the end-point may then be utilized to provide an indication of the original concentration of the hydrochloric acid in the solution. As a matter of fact, such an ampere-hour meter may be calibrated directly in terms of acid concentration. Where the current is not maintained constant, the system of Figs. 1 and 2 (already described) will be utilized. Of course, as the end-point is attained, the switch 25 is opened to terminate the electrolysis.

In electrotitration systems constructed in accordance with the present invention, it will be observed that there have been eliminated the use of all standard solutions and the need for careful measurement of volumes of such standard solutions. The entire titration system of the illustrative examples is accomplished in terms of current flow or in terms of coulombs.

As will be later explained in detail, the electrodes 20 and 21 for continuous measurements are located up-stream with respect to the detecting electrodes 26 and 27 to assure mixture with the sample of all of the electrolytically produced titrating agent before measurement. The detecting electrodes 26 and 27 are accordingly so located as not to be affected by current flowing between electrodes 20 and 21. With such disposition of the electrodes, and with electrodes 20 and 21 in a power circuit insulated or isolated from the detector circuit including electrodes 26 and 27 in all parts thereof external to the electrolyte in the flow channel 18, the current between electrodes 20 and 21 does not affect the potential developed between electrodes 26 and 27. That potential is developed solely as a function of constituent concentration.

As another example of determination of the concentration of acid, it will be assumed that a solution of sulphuric acid is passing through the pipe 10 and that the sample thereof is being discharged at a constant rate from the pipe 17 into the flow channel 18. If a current is caused to flow between the electrodes 20 and 21, respectively of silver and platinum, there will be a migration to the cathode 21 of hydrogen ions and silver ions. The migration of the silver ions will interfere with the cathodic formation of hydrogen. In accordance with the preferred form of the invention, there will be preferably added, by means of the constant-head vessel 35, a solution of sodium chloride fed thereto by way of pipe 34. The constant-head device 35 is not in this case utilized to produce a constant flow but to assure the flow of an excess of sodium chloride over and above that necessary to the chemical reactions now to be described. Neither the concentration of the sodium chloride solution nor the amount fed into the flow channel 18 is important to this aspect of the invention. The principal requirement is that it be in excess of the amount required for the chemical reactions. Consequently no measurement of the addition-agent, the sodium chloride, is required.

With the mixture of the sulphuric acid solution and the sodium chloride solution flowing through the channel 18 there will be produced, under the influence of the current flow between the anode 20 and the cathode 21, reactions which include the following: Hydrogen ions at the cathode form hydrogen; at the anode, silver ions are formed which subsequently react with the chloride ions from the addition-agent to form silver chloride which is insoluble and, hence, is removed from solution and does not interfere with the discharge of the hydrogen ions at the cathode. Otherwise, silver sulphate would form and would be diffused through the solution. In this manner, the cathode reaction is controlled so that the removal of the acid-imparting material is directly related to the electrolysis with a minimum, or absence of, interference from other reagents present.

The normality of the sulphuric acid solution is given by the same Equation 5 as was previously used for expressing the normality of the hydrochloric acid solution. Let it be supposed that the current as registered by the meter 24 is 0.162 ampere, and that the rate of flow of solution into channel 18 is 0.0402 cubic centimeter per second. The normality of the solution as given by Equation 5 is:

$$N = \frac{I}{96,500R} = \frac{0.162}{(96,500)(0.0000402)}$$
$$N = .0418$$

The use of addition-agents is not limited to the illustrative example. If the compositional characteristic is not of itself affected in a desired way by electrolysis, the addition-agent may be such as to produce under electrolysis a further reagent which will react therewith and which may be utilized for the determination of the compositional characteristic.

It will now be assumed that the percentage or concentration of sodium sulphite in a solution passing through the pipe 10 is to be determined. A continuous sample is withdrawn and discharged by the pipe 17 into the flow channel 18. In order quantitatively to determine the amount of sodium sulphite present, an addition-agent is added by means of the constant-head receptacle 35. For example, a suitable iodide or bromide may be used as the addition-agent. Specifically, it will be assumed that sodium iodide is supplied by the pipe 37 in quantity in excess of that which will be utilized in the subsequent reactions. In accordance with the invention, current is supplied to the electrodes 20 and 21, which electrodes in this case may both be of an inert material such, for example, as platinum. The electrolytic action produces reactions, the most significant of which includes the production of hydrogen at the cathode and at the anode conversion of iodide ions to iodine. The iodine is an oxidizing agent which acts upon the sulphite to convert it to sulphate, with a concurrent formation of iodide. The formation of the iodine, which oxidizes the sulphite to the sulphate, is produced at a rate determined by the current flow. By utilizing a suitable indicator which will give a definite response when all of the sulphite has been converted to sulphate, the concentration thereof in the original solution may be readily ascertained by the current required to produce the necessary amount of the oxidizing agent, the iodine. In this case, the appearance in the solution of an excess of iodine indicates the desired end-point. Either the material being titrated or the electrolytically produced titrating agent may be used to indicate end-points, depending upon the particular reactions which occur.

The indicating system which has already been described and comprising the electrodes 26 and 27 may be used for determination of the end-point provided one of the electrodes, the electrode 26, be of platinum or other suitable material immersed in the solution and functioning as an iodine electrode, in manner well understood by those skilled in the art. As before, the contact 33 will be preset with reference to the scale 32 so that when the end-point is attained the galvanometer pointer will be at its neutral or null position.

It will be readily understood that the foregoing quantitative determination of the sulphite may also be obtained by a batch process in which the meter 24 will measure the coulombs of electricity required to bring the batch or fixed quantity of the sulphite solution to its end-point. In this case, the switch 25 will be opened as the end-point is reached.

When a coulometer or other suitable means for measuring coulombs is employed, the resistor 23 may be fixed and the current may vary in manner as may be determined by the other parameters of the system including the resistance of the electrolyte.

In some cases, later to be described, apparatus is employed which permits a virtual, or real, separation of the cathodic and anodic regions except for the migration of ions produced by the flow of current. This may be readily done with reference to the flow channel 18 by substituting the arrangement of Fig. 4 for that disclosed in the rectangle 50 of Fig. 1. With this substitution, the flow channel 18 will be provided with a separate compartment 51. By way of example, it will be assumed the anode 20 is located in compartment 51 for separating the reaction products formed at the anode 20 from the solution in the flow channel 18. Any suitable material may comprise a separating diaphragm, such as parchment paper, or unglazed ceramic material 52.

In every application of the invention, an electrolyte is acted upon by the electrodes 20 and 21; that is to say, under the action of an electric potential there will be a migration or movement of positively charged ions to the cathode and a migration or movement of negatively charged ions to the anode. There will be migration of the hydrogen ions to the cathode and migration of chloride ions to the anode. The hydrogen ions upon reaching the cathode 21 will be converted into hydrogen, which is given off at the cathode. Concurrently the chloride ions upon arrival at the anode 20 unite with silver ions formed as a result of the electrolytic action. Quantitatively these reactions depend upon the magnitude of current flowing between electrodes 20 and 21.

For the continuous process, when the current is of sufficient magnitude to convert at the cathode all of the hydrogen ions which impart to the solution in the flow channel 18 the acid characteristic, the end-point will have been attained. This removal of the acid-imparting material is relatively independent of the reactions taking place at the anode. Hence, the anode may be separated from the cathode 21 except for the effects directly produced by the flow of current therebetween and thermal diffusion. The latter may be reduced to a very small magnitude by proper construction of the system.

In some cases there may be simultaneously produced an acid at the anode and a base at the cathode. If acidity or alkalinity were to be determined, the simultaneous and opposite reactions might nullify each other. By physically isolating the products produced at the anode and the cathode, electrotitration for a base or an acid, or both, may be carried out.

Another simple form of apparatus in which the two electrodes 20 and 21 are isolated has been illustrated in Fig. 5. The electrodes 20 and 21 are immersed in the two legs 54 and 55 of an H-tube 56, which are separated from each other by suitable material such as parchment paper or unglazed ceramic material 52. As further shown in Fig. 5, the two electrodes 20 and 21 are connected through a reversing switch 57 to a series-circuit comprising the meter or coulometer 24a, the resistor 23, and the source of current, the battery 22. In accordance with the invention, a system of this type lends itself to the determination of basicity of a solution of sodium hydroxide. A known quantity of sodium hydroxide solution in mixture with an excess of sodium sulphate is introduced into the leg 55 of the H-tube 56 while a neutral solution, such as sodium sulphate, is introduced into the leg 54. The reversing switch 57 is then closed in a direction such that current flows from the anode 20 to the cathode 21. There is also added to the solution in the leg 55 a suitable color-indicator of a pH end-point. This indicator may be phenolphthalein or methyl orange. The electrolysis resulting from the passage of current produces anodic reactions which discharge oxygen, thus removing hydroxyl ions from the solution. When the resultant change in the pH value of the solution reaches the critical end-point for the indicator used, there will be a significant change of color. Phenolphthalein is colored in basic solution. When the pH of the solution reaches a predetermined value there is a characteristic color change to colorless produced by the phenolphthalein. This characteristic change in color indicates the end-point for the phenolphthalein indicator. If methyl orange is used as the indicator, a characteristic color change (from a pink in an acid solution to a characteristic yellow in a basic solution) occurs at a different but characteristic pH value of the solution. In either case, the compositional characteristic, the pH value, is known by the color change which takes place. Hence, there may be determined the basicity of the sodium hydroxide solution which was added to the leg 55 of the H-tube 56.

As a numerical example, the extent of removal of hydroxyl ions is given by the Equation 3 previously set forth and the symbols again bear the significance previously given them. The meter 24a gives the quantity Q for the titration and this, with the measured volume of solution employed, suffices to give the normality of the sodium hydroxide in the solution. Let it be assumed, for example, that a volume of 0.0250 liter of solution containing sodium hydroxide is contained in the leg 55 of the H-tube, and that the quantity of current as indicated by the meter 24a is 97.3 coulombs. The normality of the original solution with respect to sodium hydroxide is given as follows:

$$N = \frac{Q}{96,500V} = \frac{97.3}{(96,500)(0.0250)}$$

$$N = 0.0403$$

In accordance with the present invention, advantage may be taken of the character of the chemical reactions which take place at the anode 20 and the cathode 21 if these reactions reverse, upon reversal of current flow. If it is suspected that the electrotitration has proceeded beyond the end-point for a given indicator, the reversing switch 57 may be operated to reverse the direction of current flow between the electrodes 20 and 21. Such a reversal of current flow reverses the functions of the electrodes. The electrode 20 then becomes the cathode and under the electrolytic action, hydrogen ions present within the solution are destroyed at the cathode 20 with production of hydrogen. This reaction, by eliminating the hydrogen ions, increases the relative basicity of the solution. The reversal of the electrolytic action may be continued until the characteristic color change is attained, at which point the reversing switch 57 may be moved to its open position. If the meter 24a has been utilized to measure the coulombs of electricity re-required on the first operation, as well as the coulombs to electricity utilized in the reverse operation, the latter is subtracted from the former to obtain the coulombs which were necessary to bring the solution to its predetermined end-point.

From the foregoing example it will be readily understood that a solution of sulphuric acid in mixture with sodium sulphate may be placed in the leg 54 of the H-tube 56, with a suitable neutral solution such as sodium sulphate in the other leg 55. In this case, the acidity at the cathode 21 may be reduced in accordance with the coulombs of electricity which produces the electrolysis. When an end-point is reached as indicated by a suitable indicator, the switch 57 will be opened and the coulombs determined from the meter 24a, or the acidity may be read directly therefrom.

As before, if the electrolytic action proceeds beyond the end-point the reversing switch 57 is operated to reverse the direction of current flow and to reverse the chemical reactions until the acidity within the leg 55 has brought the solution to the desired end-point. Again the meter 24a measures the coulombs of electricity for the reverse operation. These are again subtracted from those which produced the original change in the compositional characteristic for the net determination of the coulombs in terms of the original alkalinity of the solution.

Further, in accordance with the invention, solutions which contain a known quantity of a reagent and standardized solutions may be produced by electrolysis. There is a definite, proportional relationship between the quantity (the coulombs) of electricity and the quantity of reagent electrolytically produced. Therefore, by utilizing any of the modifications described, a desired solution of known strength may be produced. Where the anodic and cathodic reactions are separated, as in Fig. 5, there is placed in one or the other of legs 54 and 55 of the H-tube 56 a solution, with an added agent (if necessary)

for electrolytic production of the reagent desired therein. An exact quantity of reagent may be produced by applying a predetermined number of coulombs. Without further measurements or other considerations, the solution, after said electrolysis, will have the predetermined quantity of reagent and may thereafter be utilized in standardizing a solution. Of course, when the reaction at the anode or cathode does not adversely affect the yield of the desired reagent, the system of Fig. 1 may be similarly utilized.

If the volume of the solution which contains the known quantity of the electrolytically produced reagent is known, then its concentration also is known. This solution is a standard solution, since its concentration is known, and it may be used to standardize another solution or to effect a volumetric analysis.

Specifically in order to prepare a known solution of iodine, a solution of potassium iodide will be introduced in the legs 54 and 55. The concentration of the potassium iodide solution need not be known, but potassium iodide must be present in excess of the requirements of the electrolytic process. The cathode 21 will comprise a coating of silver chloride on a base of silver while the anode 20 may be of an inert material such as platinum. Under electrolysis iodine will be formed at the anode 20. After the passage of a known quantity of current for a known time, the amount of iodine produced will be known. Hence, it is only necessary to drain or pour from the leg 55 the solution contained therein. For example, it will be assumed that a constant current of 0.0500 ampere is caused to flow for a period of 1800 seconds. The amount of iodine is given by Equation 1 above set forth. Specifically, $$E=\frac{It}{96,500}=\frac{(.05)(1800)}{96,500}$$

$$E=0.000933$$

Hence, the solution has 0.000933 equivalents of iodine. This solution, containing the known quantity of iodine, may be used to standardize another solution, such as one of sodium thiosulfate.

If the volume of the above solution has been determined its concentration may be calculated by the Equation 2 previously cited and it thus becomes a standard solution which may be utilized in volumetric analysis. Suppose that the volume of the above solution was 0.0450 liters, then its normality is given as follows:

$$N=\frac{E}{V}=\frac{0.000933}{0.0450}$$

$$N=0.0207$$

By way of a further example, in order to prepare a solution which contains a known amount of a ferrous salt, ferrous sulphate for example, the apparatus of Fig. 5 is filled with a solution which contains ferric sulphate in excess of the desirous amount of ferrous sulphate to be prepared. The switch 57 may be closed in either direction and the electrode which becomes the cathode effects the conversion of ferric ions to ferrous ions. It is necessary, however, to control the potential at the cathode so as not to exceed that which would cause the deposition of iron. This may be accomplished by using a cathode of large area and by adjusting the setting of the resistance 23 so as to limit the current. To be useful, this solution need not have all of the ferric sulphate converted to ferrous sulphate and the electrolysis may be stopped at the desired point. The amount of ferrous sulphate in equivalents which will be produced in the solution is given by Equation 1, namely:

$$E=\frac{Q}{96,500}$$

Suppose that the meter 24a showed that 386 coulombs had passed, then the ferrous sulphate in equivalents would be:

$$E=\frac{386}{96,500}=0.00400$$

If the volume of the ferric sulphate solution which was placed in the cathodic compartment of the H-tube 56 was measured, then the normality of the resultant ferrous sulphate solution may be expressed by Equation 3, namely:

$$N=\frac{Q}{96,500V}$$

Let the volume of the solution be 0.0200 liter, then:

$$N=\frac{386}{(96,500)(0.0200)}=0.200$$

Where batch-operations only are to be conducted, the form of apparatus shown in Fig. 6 may be utilized. In Fig. 6, the electrodes 20a and 21a have been shown as concentric cylinders disposed in a beaker or vessel 41. Within these concentric electrodes there are provided detecting electrodes 26a and 27a. In order to reduce the time lag and to insure the immediate transfer to the detecting electrodes of the electrolyzed solution, a gas stirring device is provided, this device comprising a tube 60 leading from a suitable source of supply of an inert gas, such as nitrogen. The inert gas is released from the open end of the tube 60 and bubbles upwardly through the solution and around the detecting electrodes 26a and 27a. The flow of gas induces circulation of the fluid from the electrodes 20a and 21a to electrodes 26a and 27a.

There has already been described the measurement of the concentration of hydrochloric acid in a solution. In accordance with the invention, the concentration of the chloride ions in a solution may also be determined. For example, there may be introduced into the vessel 41 of Fig. 6 a known volume of a solution bearing the chloride ions, such, for example, as sodium chloride, and an addition-agent such as sodium nitrate. In this case the anode 20a will be silver and the cathode 21a will be an inert material such as platinum or the like. At the anode, the electrolytic action produces silver chloride. By utilizing a conventional reference electrode 26a, for example, of calomel or the like, in conjunction with a measuring electrode 27a of silver, the end-point may be determined. The afore-mentioned silver chloride is formed by the release of silver ions at the anode which combine with the chloride ions. When the chloride ions have been depleted, there appears in the solution an increase in the silver ions. As this excess appears, the detecting electrode 27a produces a characteristic potential which indicates the arrival of the solution at its end-point.

For example, suppose that the circuit of Fig. 5 is employed in measuring the chloride ion, or sodium chloride concentration, and that the current is constant and numerically equal to 0.175 ampere and flows for a period of 2100 seconds.

Also let the volume of solution be 0.035 liter. Then Equation 4 is again used:

$$N = \frac{It}{96,500V} = \frac{(0.175)(2100)}{(96,500)(0.035)}$$
$$N = 0.109$$

which is normality of the original solution with respect to sodium chloride.

Since in the foregoing example, Fig. 6, the anode 20a and the measuring electrode 27a are both of silver, only one of them need be provided in certain cases. Under certain conditions the single electrode, either 20a or 27a, will perform both functions described for electrodes 20a and 27a. In the three-electrode modification, the outer face of cylindrical electrode 27a (or 20a) will function as the anode in co-operation with the cathode 21a. The inside face of cylindrical electrode 27a (or 20a) will function as the detecting or measuring electrode in cooperation with the conventional reference electrode 26a. Hence the three electrodes 26a, 27a (or 20a), and 21a will perform in this instance all of the functions described for the two pairs of electrodes 26a—27a and 20a—21a.

The invention is not limited to the determination of the compositional characteristic of solutions or of solids suspended in solutions. The invention also lends itself to continuous or intermittent gas analysis. More specifically, there is shown in Fig. 7 an electrolytic titrometer in which gas is fed to the system by way of the pipe 62, having a distributing head 63 at the lower portion thereof. Gas discharged from the distributing head flows upwardly around and between cylindrical electrotitration electrodes 64 and 65. The outer electrode 65 is provided with a series of openings 66 for exit of the gas. The gas, in the form of a series of bubbles, flows outwardly through the openings and up the inclined tubular connection 67, and is discharged from the system by way of pipe 68. The gas not only intimately diffuses through the electrolyte 69 but it also induces circulation of the electrolyte about a circuit including the titration electrodes 64 and 65, the inclined tubular connection, and the vertical tube 70. Within the tube 70 are mounted a reference electrode 71 and a detecting electrode 72. Though the titration electrodes and the reference and detecting electrodes are separated from each other, the foregoing circulation of the electrolyte minimizes time delay due to changing compositional characteristics of the gas undergoing analysis.

In accordance with the invention, there may be readily determined the quantity of gas, liquid, or solid present in a gas. This determination is highly sensitive and by means of the invention it is possible to detect impurities which may be present only in slight degree. If the amount of sulphur dioxide present in a gas is to be determined, an electrolyte is provided in the system of an alkaline character, with an added agent which supplies iodide ions. Specifically, the electrolyte may be sodium hydroxide in mixture with sodium sulphate, with an added agent of sodium iodide.

It will be assumed that a gas which is suspected of containing sulphur dioxide is inert with respect to the chemical reactions which take place in the electrotitration system. For example, let it be air contaminated with sulphur dioxide. Either a measured quantity of air is injected into the electrolyte or air is fed into the electrolyte at a uniform rate. If the concentration of sulphur dioxide in the air is very small, the preferred method of operation will be continuously to supply the air through the pipe 62, Fig. 7, so that it continuously bubbles through the electrolyte 69. Measurements in accordance with the invention are then conducted at desired time intervals, or the measurements are made continuously as in the example of the continuous analysis of the hydrochloric acid solution.

More specifically, the vessel 67 will be filled with the aforesaid electrolyte. The sulphur dioxide, in mixture with air, is introduced through the head 63. The sulphur dioxide unites with the sodium hydroxide to form sodium sulphite. The sodium sulphite is then determined in manner already described. It will not be necessary continuously to add sodium iodide because iodide is regenerated in the reaction. For continuous operation, it will be necessary to make up for the loss of the sodium hydroxide which reacts with the sulphur dioxide. There will also be a loss of water. Both can be added as needed to maintain the volume constant.

It is to be understood that other means of detecting the end-point may be utilized, such as the addition of a starch solution which, upon the attainment of the end-point, is distinctively colored by the iodine. In case the concentration of sulphur dioxide is substantial, the system may be operated in much the same way as has been set forth in connection with Figs. 1 and 2. The electrotitrating current will be applied continuously so as to yield the titrating reagent in quantity which will maintain the solution at its end-point. Knowing the rate of flow of the gas and the rate of flow of the necessary titrating current, the amount of sulphur dioxide present will be continuously indicated. It may be further mentioned that a batch-operation may also be conducted where a predetermined quantity of gas is injected into the electrolyte, followed by electrotitration for determination of the sulphur dioxide.

The determination of the concentration of sulphur dioxide in air may be accomplished by using the equations previously given. For a continuous analysis of sulphur dioxide in air, Equations 5 and 2 are combined, eliminating N:

$$\frac{E}{V} = \frac{I}{96,500R} \qquad (6)$$

E is the equivalent of sulphur dioxide in the volume V of air. I is the current employed, and R is the rate of flow of the air into the chamber of Fig. 7. The units of R must be in volume, as V (liters), and time, seconds.

Let a current of 0.052 ampere be required in the electrolytic titration and a flow of air into the cell be 0.020 liter per second. Then:

$$\frac{E}{V} = \frac{0.052}{96,500 \times 0.020}$$
$$\frac{E}{V} = 2.7 \times 10^{-5}$$

or, $2.7 \times 10^{-5}$ equivalent of sulphur dioxide per liter of air.

If hydrogen sulphide is to be quantitatively determined, for example the amount of hydrogen sulphide in air, the foregoing procedure is repeated. The electrolyte will again be an alkaline solution in which the hydrogen sulphide will be absorbed. For example, the electrolyte may be a solution of sodium acetate. The anode 65 will be selected of a metal, as of zinc, which forms an insoluble sulphide. Formation of the insoluble sulphide removes the sulphide ions from the solution. At the platinum cathode 64 hydrogen ions are discharged. The detecting cathode 72 will be of the same material as the anode, of zinc, while the reference electrode 71 will be a conventional electrode, such as the calomel electrode.

The various examples discussed above have been selected to illustrate the broad application of the invention to the determination of widely differing substances. The formation in a solution of positive and negative ions is fairly well known to those skilled in the art. The substances or products produced at the anode and cathode, under the action of electrolysis, are also relatively well known. Information of this character may be readily utilized in applying the invention to many materials not specifically discussed herein. The principal requirement is in each case that a reaction which takes place at the cathode and/or the anode, as the case may be, shall effect, either directly or indirectly, a stoichiometric change in the substance being titrated. If the electrolyte and/or the substance under test do not yield the desired reagents or the desired chemical changes necessary to the determination of the desired compositional characteristic, added agents are employed to produce the needed chemical changes. These may function directly through electrolytic titration or they may serve as intermediary agents to produce intermediate chemical reactions which yield reagents or conditions which are requisite to the process, whose compositional characteristic is under test. In other words, an electrolyte is selected with reference to the desired change in the compositional characteristic which is to be effected. Again, it is important to select the added agent and the electrodes with reference to their electrochemical properties so that the material removed from the solution or the reagent added thereto, is preferred over other materials or reagents which will not yield, or which will interfere with, electrolytic titration with reference to the desired compositional characteristic.

Besides its wide application and its ease of application, electrotitration has the further advantage of accurate, precise determination of small quantities of a substance. This will be readily understood in terms of chemical titration. It is difficult to split a drop of a titrating solution. One drop of a solution is about five-hundredths of a milliliter. If the titrating solution is a one-thousandth normal solution, it corresponds to fifty billionths of a chemical equivalent. In contrast, 100 microamperes flowing for fifty seconds are about equal to the same fractional chemical equivalent. The ease of subdividing the fifty seconds, or, indeed, of decreasing the current below 100 microamperes is obvious. Either or both may be readily and conveniently accomplished accurately to control the electrotitration.

A further advantage of the present invention is that no volume change occurs during titration. In the case of an addition of a standardized solution the volume of the reaction system increases. This may in some cases be very objectionable. In accordance with the invention, the titration-producing reactions do not appreciably affect the volume of the reaction system.

The various forms of apparatus illustrated are intended to be illustrative of the various forms which the invention may take. For example, in Fig. 1 the system is illustrated diagrammatically.

It is of the same general type of apparatus as illustrated in Fig. 8 where the parts have been given the same reference characters. In many applications, it will be advantageous to utilize a somewhat larger vessel 18 into which there is discharged by way of the pipe 17, the material to be electrotitrated. Added agents may be discharged by way of the pipe 37. A stirrer of the mechanical type may be utilized or gas stirrers, such as shown in Fig. 6, or other types may be utilized. A relatively small flow channel extends from the vessel 18 to the exit pipe 19, with the reference electrode 26 and the detecting electrode 27 disposed adjacent the outlet. Instead of the simple plate electrodes 20 and 21, concentric cylinders, such as illustrated in Figs. 6 and 7, may be utilized in the vessel 18.

Certain subject matter disclosed but not claimed in this application has been included in continuation-in-part applications Serial Nos. 152,734 and 271,537.

Additional modifications will now suggest themselves to those skilled in the art and all modifications coming within the spirit and scope of the invention are intended to be covered by the appended claims.

What is claimed is:

1. The method of utilizing the rate of flow of a unidirectional current and the rate of flow of a solution for determination of the concentration of a constituent in said solution which comprises passing said solution through a treating zone at a measured rate, passing said current at a measured rate through said solution while in said zone electrolytically to change the concentration of said constituent in said zone, and then varying at least one of said rates of flow to bring the concentration of said constituent in said solution to a predetermined value, whereby the change in said concentration of said constituent can be expressed in terms of said measured rates of flow of said current and of said solution.

2. The method of continuously determining the concentration of a constituent in a solution which comprises passing said solution through a treating zone at a measured rate of flow, passing direct current at a measured rate of flow through said solution while in said treating zone electrolytically to change the concentration of said constituent in said solution, and then varying at least one of said rates of flow to bring said concentration of said constituent to an end point, whereby at said end-point the relative rates of flow of said current and of said solution are indicative of said concentration of said constituent in the initial solution.

3. The method of continuously determining the concentration of a constituent in a solution which comprises passing said solution at a measured rate of flow through a treating zone, passing direct current at a measured rate of flow through said solution while in said treating zone electrolytically to change the concentration of said constituent in said solution, and then varying the rate of flow of said direct current to bring said concentration of said constituent to a predetermined value, whereby at said predetermined value the rate of flow of current for the measured rate of flow of said solution is indicative of said concentration of said constituent in the initial solution.

4. The method of continuously controlling the concentration of a constituent in a liquid stream which comprises adding a reagent chemically affecting the concentration of the constituent in said stream, continuously withdrawing from said stream a sample after addition of said reagent, passing said sample through a treating zone at a measured rate of flow, passing direct current at a measured rate through said sample in said treating zone electrolytically to change the concentration of said constituent in said zone, and then varying the rate of addition of said reagent in accordance with departure in concentration of said constituent in said sample from a predetermined value until said direct current brings said concentration of said sample to said predetermined value.

5. The method of continuously determining the concentration of a constituent in a solution which comprises producing a measured rate of flow (R) of said solution through a treating zone, passing direct current (I) at a measured rate through said solution while in said treating zone electrolytically to change the concentration of said constituent in said solution, and then varying at least one of said rates of flow to bring the concentration of said constituent to that predetermined value at which the normality (N) of the solution may be expressed as $$N = \frac{I}{R}$$

times a constant.

6. In a system for continuously determining the concentration of a constituent in a solution, the combination of a flow channel forming a treating zone for passage of said solution therethrough, means for delivering said solution to said zone, a flow controller for varying the rate of flow of said solution through said zone, means including a pair of electrodes disposed for flow of direct current therebetween electrolytically to vary the concentration of said constituent in said solution during its passage through said zone, means in circuit with said electrodes for measuring said direct current, and means for varying the rate of at least one of said flows to bring said concentration of said constituent to a predetermined value.

7. In a system for continuously determining the concentration of a constituent in a solution, the combination of a flow channel forming a treating zone for passage of said solution therethrough, a flow controller for predetermining the rate of flow of said solution through said zone, means including a pair of electrodes disposed for passage of direct current therebetween and through said solution electrolytically to vary the concentration of said constituent in said solution during its passage through said zone, means in circuit with said electrodes for measuring said direct current, and means for varying the rate of flow of said direct current between said electrodes until arrival of said concentration of said constituent at a predetermined end-point.

8. A system for continuously determining the concentration of a constituent in a solution comprising a container having an inlet and an outlet for passage of fluid therethrough, a flow controller for delivering said solution to said container for flow therethrough at a rate determined by said flow controller, a pair of current electrodes for passage of direct current through said solution electrolytically to vary the concentration of said constituent of said solution during passage of said solution through said container, means in circuit with said current electrodes for measuring said current, and means for varying the rate of flow of said direct current between said current electrodes until arrival of said concentration of said constituent to a predetermined end-point.

9. In quantitative analysis by titration involving the quantitative reaction in an electrolyte of a titrating agent with a constituent to be measured, the improvement which comprises regulating the amount of titrating agent present in the electrolyte by electrolysis in situ, measuring the current employed in the electrolysis to give a measure of the rate of consumption of titrating agent in the reaction, sensing the unreacted amount of one of the reactants, and varying the electrolytic current responsive to variations in said unreacted amount of said one of said reactants to maintain the concentration of said one of said reactants at a fixed level.

10. In a system for continuously determining the concentration of a constituent in a fluid, the combination of a vessel containing electrolyte forming a treating zone for passage of said fluid therethrough, a flow controller for controlling the rate of flow of said fluid through said zone, means including a pair of electrodes disposed for flow of direct current therebetween electrolytically to vary the concentration of said constituent in said zone during its passage through said zone, means in circuit with said electrodes for measuring said direct current, and means for varying the rate of at least one of said flows to bring said concentration of said constituent to a predetermined value.

11. In quantitative analysis by titration involving the quantitative reaction in an electrolyte of a titrating agent with a constituent to be measured, the improvement which comprises regulating the amount of titrating agent present in the electrolyte by electrolysis in situ, measuring the current employed in the electrolysis to give a measure of the rate of consumption of titrating agent in the reaction, sensing the unreacted amount of one of the reactants potentiometrically, and varying the electrolytic current responsive to variations in the sensed potential to achieve a fixed concentration of said one of the reactants.

12. A system of quantitative analysis comprising a vessel for electrolyte containing a constituent to be measured, a pair of generating electrodes disposed within said vessel for flow of direct current betweeen them electrolytically to change the concentration of said constituent in said electrolyte, current measuring means, a current regulator having a sensing circuit and a direct current power circuit including said generating electrodes and said current measuring means, a pair of voltage-producing sensing electrodes neither of which carries said direct current disposed in said vessel, means including said sensing electrodes connected in said sensing circuit to produce therein a voltage of magnitude related to the concentration of said constituent in said electrolyte, and said regulator including means for establishing between said generating electrodes flow of direct current of magnitude dependent upon a difference between an end-point potential and the voltage produced by said sensing electrodes and independent of the potential of either of said generating electrodes to bring the concentration of said constituent in said electrolyte to a predetermined value corresponding with that represented by said end-point potential.

13. A system of quantitative analysis comprising a vessel for electrolyte containing a constituent to be measured, a pair of generating electrodes disposed within said vessel for flow of direct current between them electrolytically to change the concentration of said constituent in said electrolyte, current measuring means, a current regulator having a sensing circuit and a direct current power circuit including said generating electrodes and said current measuring means, a pair of voltage-producing sensing electrodes neither of which carries said direct current disposed in said vessel, means including said sensing electrodes connected in said sensing circuit to produce therein a voltage of magnitude related to the concentration of said constituent in said electrolyte, said regulator including means for establishing between said generating electrodes flow of direct current of magnitude dependent upon a difference between an end-point potential and the voltage produced by said sensing electrodes and independent of the potential of either of said generating electrodes to bring the concentration of said constituent in said electrolyte to a predetermined value corresponding with that represented by said end-point potential, and electrical isolating means interposed between said power circuit and said sensing circuit in all portions thereof external to the electrolyte in said vessel.

EDGAR L. ECKFELDT.

REFERENCES CITED

The following references are of record in the file of this patent:

UNITED STATES PATENTS

| Number | Name | Date |
| --- | --- | --- |
| 1,001,589 | Hatfield | Aug. 22, 1911 |
| 1,530,833 | Koeler | Mar. 24, 1925 |
| 2,024,819 | Ehrhardt | Dec. 17, 1935 |
| 2,206,026 | Buser | July 2, 1940 |
| 2,319,196 | Anderson et al. | May 18, 1943 |

FOREIGN PATENTS

| Number | Country | Date |
| --- | --- | --- |
| 282,170 | Great Britain | Dec. 20, 1927 |
| 692,099 | Germany | June 12, 1940 |

OTHER REFERENCES

"Outlines of Theoretical Chemistry," 6th edition (1937), by Getman et al., page 477.

"Transactions of the Electrochemical Society," vol. 76 (1939), pages 303 thru 324.

"Osterreichische Chemiker Zeitung" (1938), pages 217 thru 223.

"Hackh's Chemical Dictionary," 2nd edition (1937), page 948.

"Transactions of The Faraday Society," vol. 38 (1942), pages 27 thru 33.